(12) United States Patent
Kuecker et al.

(10) Patent No.: US 6,637,586 B1
(45) Date of Patent: Oct. 28, 2003

(54) ACCUMULATING PALLET CONVEYOR AND STORAGE SYSTEM

(75) Inventors: James R. Kuecker, Leawood, KS (US); Lucas Peterson, Peoria, IL (US); Steven L. Hayslett, McLean, VA (US)

(73) Assignee: Leap Frog Systems, Inc., Belton, MO (US)

( * ) Notice: Subject to any disclaimer, the term of this patent is extended or adjusted under 35 U.S.C. 154(b) by 43 days.

(21) Appl. No.: 10/077,132

(22) Filed: Feb. 15, 2002

(51) Int. Cl.$^7$ .............................................. B65G 25/00
(52) U.S. Cl. .................................. 198/774.2; 198/774.1
(58) Field of Search ............................. 198/751, 774.1, 198/774.2, 774.4, 750.1, 750.14, 750.2; 414/750

(56) References Cited

U.S. PATENT DOCUMENTS

| | | | |
|---|---|---|---|
| 3,322,259 A | | 5/1967 | Milazzo |
| 3,355,008 A | | 11/1967 | Milazzo |
| 3,850,287 A | * | 11/1974 | Petros .................... 198/774.1 |
| 4,219,113 A | | 8/1980 | Fieser et al. |
| 4,684,311 A | * | 8/1987 | Dickson-Wright et al. ....... 198/774.2 |
| 4,735,305 A | | 4/1988 | Lutz et al. |
| 4,887,706 A | | 12/1989 | Gladish et al. |
| 5,025,912 A | | 6/1991 | Hashizume et al. |
| 5,139,418 A | * | 8/1992 | Rigan et al. ......... 198/774.1 X |
| 5,605,427 A | | 2/1997 | Hammond |
| 5,868,541 A | | 2/1999 | Tajima et al. |
| 6,223,885 B1 | | 5/2001 | Markiewicz |

* cited by examiner

Primary Examiner—James R. Bidwell
(74) Attorney, Agent, or Firm—Shughart Thomson & Kilroy P.C.

(57) ABSTRACT

A conveyor is disclosed comprising a track having a pair of side rails and a plurality of interconnected carts which are reciprocally moveable along the track by a pneumatic cylinder. Each of the carts includes a pair of air bladders which are selectively inflatable to move a respective load between a lowered position wherein the load rests on upper surfaces of the rails and a raised position wherein the load is lifted clear of the rails. A pneumatic system controls the cylinder and each pair bladders so as to advance a load from a loading position toward an unloading position by cyclically moving the load into the raised position, moving the carts forward, moving the load into the lowered position, and moving the carts back beneath the load. Individual pairs of bladders may be kept from inflating so as to accumulate loads near the unloading position.

27 Claims, 7 Drawing Sheets

ACCUMULATING PALLET CONVEYOR AND STORAGE SYSTEM

BACKGROUND OF THE INVENTION

1. Field of the Invention

This invention relates to conveyors for moving load units, such as loaded pallets or slip sheets, from a first location to a second location, and in particular to such a conveyor which acts to accumulate the load units proximate the second location for subsequent removal from the conveyor.

2. Description of the Related Art

Conveyors of various kinds are generally used in industry to move load units from one location to another. An accumulating conveyor differs from an ordinary transfer conveyor in that it has the ability to retain load units and store them until they can be removed as needed. One well known type of accumulating conveyor generally comprises a track upon which load units are placed and a lifting mechanism for lifting the load units relative to the track. The load units are indexed forward by sequentially lifting a load unit off of the track, moving it forward, and then setting it back down on the track. The lifting mechanism is then moved rearwardly, and the process is repeated.

For example, Milazzo, U.S. Pat. No. 3,322,259, discloses (as an alternative embodiment) an Accumulating Pallet Conveyor having a horizontal track with parallel side rails and a carriage with multiple lifting plates or platforms which are reciprocally moveable, with the carriage, along the track by a pneumatic cylinder. The carriage rolls on top of a plurality of rollers which are secured to the side rails. An air bladder is positioned beneath the lifting platform and can be inflated and deflated to raise and lower the lifting platform relative to the carriage. When the platform is lowered, any load unit positioned above the carriage will rest on the track side rails. When the platform is raised the load unit will be lifted clear of the side rails and supported by the carriage. The carriage is reciprocally moveable along the track by a pneumatic cylinder.

Inflation and deflation of the bladders in the Milazzo conveyor is controlled by a pneumatic system which includes a normally closed limit switch mounted on the first platform which actuates a solenoid valve controlling airflow through a main line. Each of the bladders is connected to the main line through a respective normally open sensor valve which is mounted in association with the next lifting plate ahead of the lifting plate under which the bladder is mounted. Note that the sensor valves are not mounted directly to the lifting platforms, therefore they only detect the presence of a load unit that is resting on the side rails, not ones that are lifted by the bladders. A normally open sensor valve mounted to the track in the unload position controls airflow to the bladder under the last lifting platform.

Thus, when a load is placed on the first lifting platform, each bladder will inflate unless there is a load unit sitting on the side rails above the next lifting platform. As the bladders inflate, the respective load units are lifted off of the side rails. Any of the remaining bladders which are controlled by sensor valves of the lifting platforms with raised loads will also inflate once the load units clear the side rails. In effect, this means that each of the bladders will eventually inflate unless all of the remaining positions nearer to the unloading position are already filled. While this system provides a means of accumulating pallets near the unloading position, it creates an undesirable time delay during the inflation process.

There remains a need for an accumulating pallet conveyor and storage system which is relatively inexpensive to manufacture while still providing for the automatic accumulation of palletized loads.

SUMMARY OF THE INVENTION

The present invention comprises a conveyor for advancing load units from a loading position toward an unloading position. The conveyor includes a track having a pair of side rails, each of the which have an upper surface and an inwardly extending flange spaced downwardly from the upper surface. The track defines a plurality of sequential load unit positions, a first of the load unit positions being a loading position proximate a first end of the track, an d a last of the load unit positions being an unloading position proximate a second end of the track.

The conveyor further includes a plurality of interconnected carts which include wheels that ride on the inwardly extending flanges of the track. The number of carts is at least one fewer than the number of load positions. A first one of the carts is located proximate the first end of the track and a last of the, carts is located proximate the second end of the track. Each of the carts is adapted to receive a respective load unit and includes a pair of lifting platforms for raising the respective load unit relative to the track. An air bladder positioned beneath each lifting platform is selectively inflatable and debatable for moving the respective lifting platform between a lowered position wherein the upper surface of the lifting platform is below the upper surface of the track side rails and a raised position wherein the upper surface of the lifting platform is above the upper surface of the track side rails. A load unit positioned on a cart will, therefore, rest on the side rail upper surfaces when the lifting platforms are lowered and be lifted clear of the side rail upper surfaces when the lifting platforms are raised.

A pneumatic cylinder is connected between the track and the carts for reciprocally moving the carts along the track between a home position wherein the first cart is in the loading position and a forward position wherein the last cart is in the unloading position. A pneumatic system controls the cylinder and each pair of bladders so as to advance a load unit from the loading position toward the unloading position by cyclically moving the load unit into the raised position, moving the carts into the forward position, moving the load unit into the lowered position, and moving the carts back into the home position beneath the load unit.

The pneumatic system includes a plurality of sensor cams, one of which is mounted to a lifting platform of each cart. Each sensor cam is operable in response to a load unit being positioned on the respective cart to actuate a respective sensor valve. Similarly, an unloading position sensor is mounted on the track at the unloading position. The unloading position sensor is operable in response to a load unit being positioned in the unloading position to actuate an unloading position sensor valve.

The pneumatic system includes a bladder inflation circuit for selectively inflating the air bladders. Airflow into the bladder inflation circuit is controlled by a bladder inflation valve which is actuated upon the carts arriving in the home position. The bladder inflation circuit includes a first branch which is connected to all of the air bladders. Airflow into the first branch is controlled by the unloading position sensor valve, such that all of the air bladders may be inflated when no load unit is positioned on the track at the unloading position.

A second branch of the bladder inflation circuit is connected in parallel to the first branch. Airflow into the second branch is controlled by the sensor valve on the first cart such that no air will flow into the second branch unless a load unit is positioned on the first cart. The second branch includes a plurality of parallel legs. Airflow through each of the legs is controlled by a respective one of the cart sensor valves. Each of the legs is connected to the pair of air bladders on the cart which is one cart nearer to the first cart than is the cart to which the sensor cam actuating the respective sensor valve is mounted.

The first branch and the second branch are interconnected such that a respective air bladder is not inflatable if load units are positioned at the unloading position and on any of the carts which are nearer to the last cart than the cart on which the respective air bladder is mounted.

DETAILED DESCRIPTION OF THE PREFERRED EMBODIMENT

Figure 1:
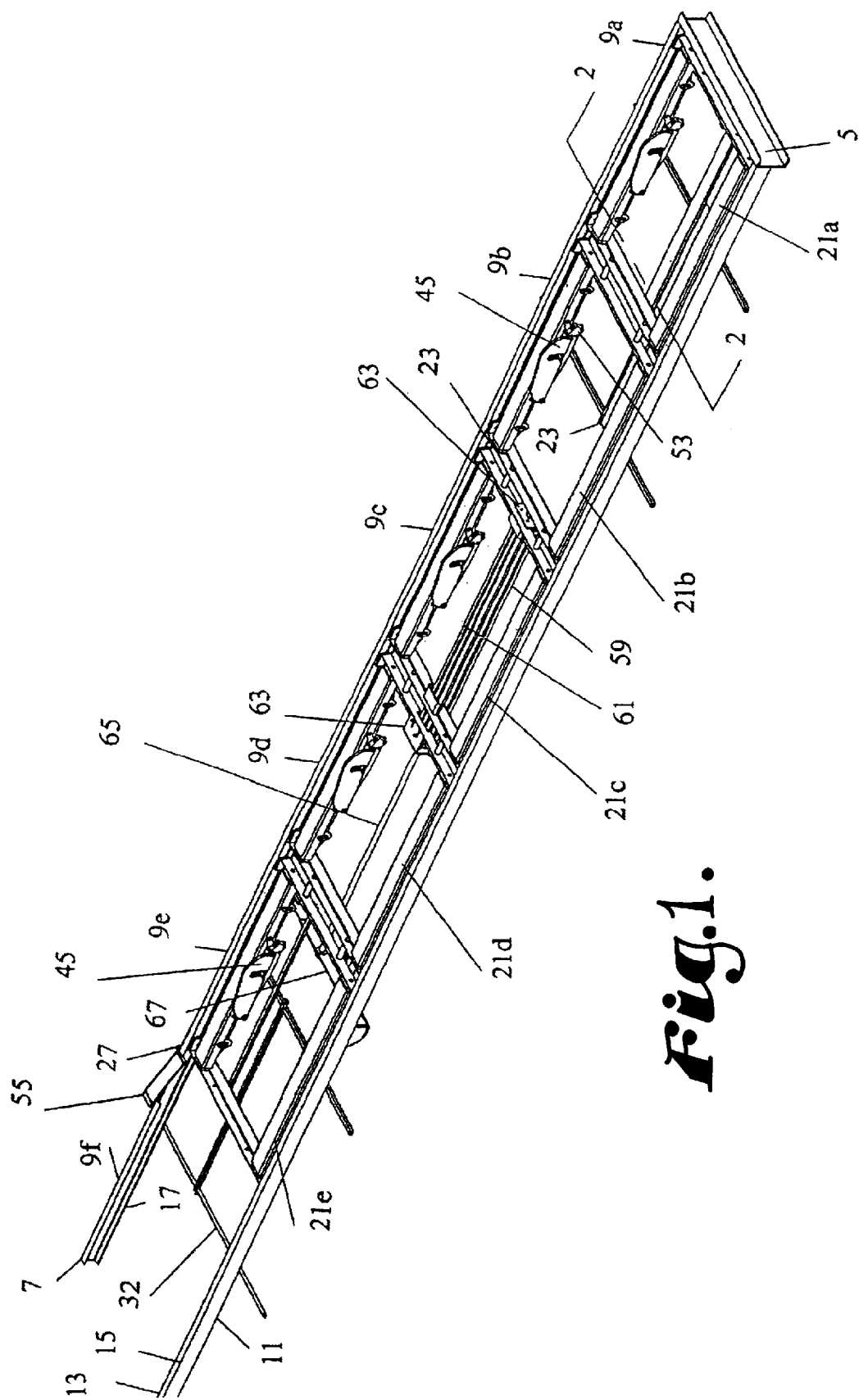
FIG. 1 is a perspective view of a horizontal pallet conveyor embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" wills refer to directions toward and away from, respectively, the geometric center of the embodiment being described and designated parts thereof. Said terminology will include the words specifically mentioned, derivatives thereof and words of a similar import.

Referring to the drawings in more detail, and in particular to FIG. 1, the reference number 1 generally designates a horizontal pneumatic conveyor 1 which embodies the fly present invention. The conveyor 1 is adapted for moving pallets or other load units 3 from a first end 5 of the conveyor 1 toward a second end 7 of the conveyor 1. The pallets 3 are indexed along the conveyor 1 through a plurality of positions 9, for example six positions 9a–9f as shown in FIG. 1. The first position 9a is a loading position into which the pallets 3 are placed, such as by a forklift (not shown). The last position 9f is an unloading position from which the pallets 3 are removed from the conveyor 1, typically by a forklift.

The conveyor 1 comprises a frame 11 having a pair of parallel spaced tracks or rails 13 which may be formed of steel channel stock. The rails 13 are supported on a framework (not shown) so as to extend generally horizontally. Each rail includes an upper surface 15 and an inwardly oriented channel 17 formed between opposing webs 19. A plurality of carts 21, which are one fewer in number than the number of positions 9 (five carts 21a–21e shown) are mounted for movement along the rails 13. The carts 21 are linked together so as to move in unison.

Figure 2:
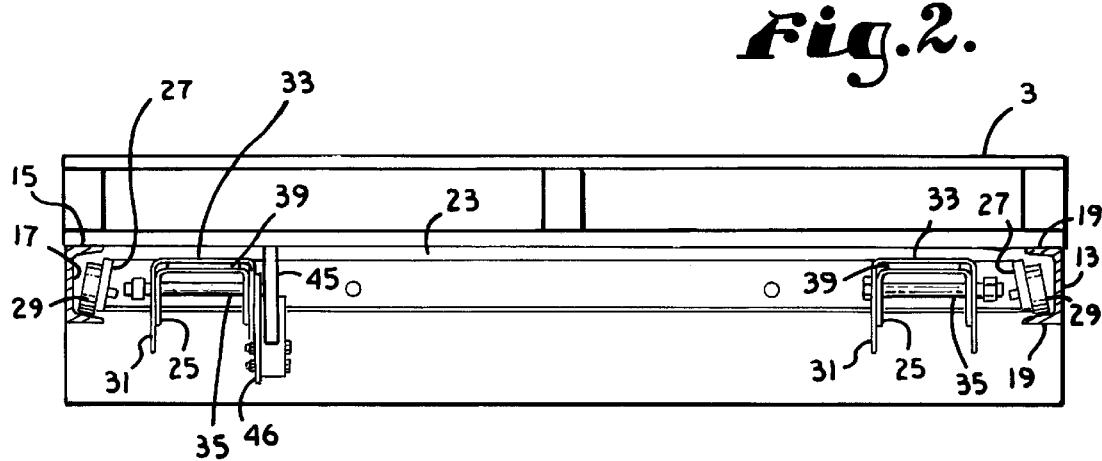
FIG. 2 is a cross-sectional view of the pallet conveyor taken generally along line 2—2 in FIG. 1 and showing the lifting platforms thereof in a lowered position.

Each cart 21 includes a pair of cross members 23, which form the front and rear of the respective cart 21. Referring to FIG. 2, a pair of longitudinal members 25 are connected between the cross members 23. The cross members 23 may be lengths of angle stock, whereas the longitudinal members 25 are inverted channels. The cross members 23 have, at each end, a wheel mounting flange 27 to which a respective wheel 29 is rotatably mounted. The wheels 29 of the carts 21 ride within the channels 17 of the rails 13. The wheels 29 may be mounted at an angle relative to vertical in order to conform to and ride upon the lower webs 19 of the rails 13, which are typically canted relative to horizontal.

Figure 3:
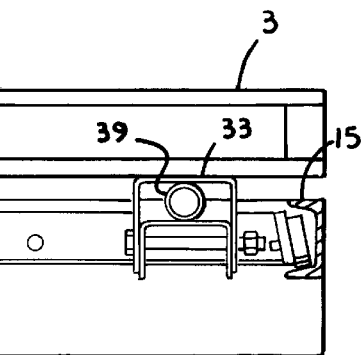
FIG. 3 is a cross-sectional view of the pallet conveyor taken generally along line 2—2 in FIG. 1 and showing the lifting platforms thereof in a raised position.
Figure 4:
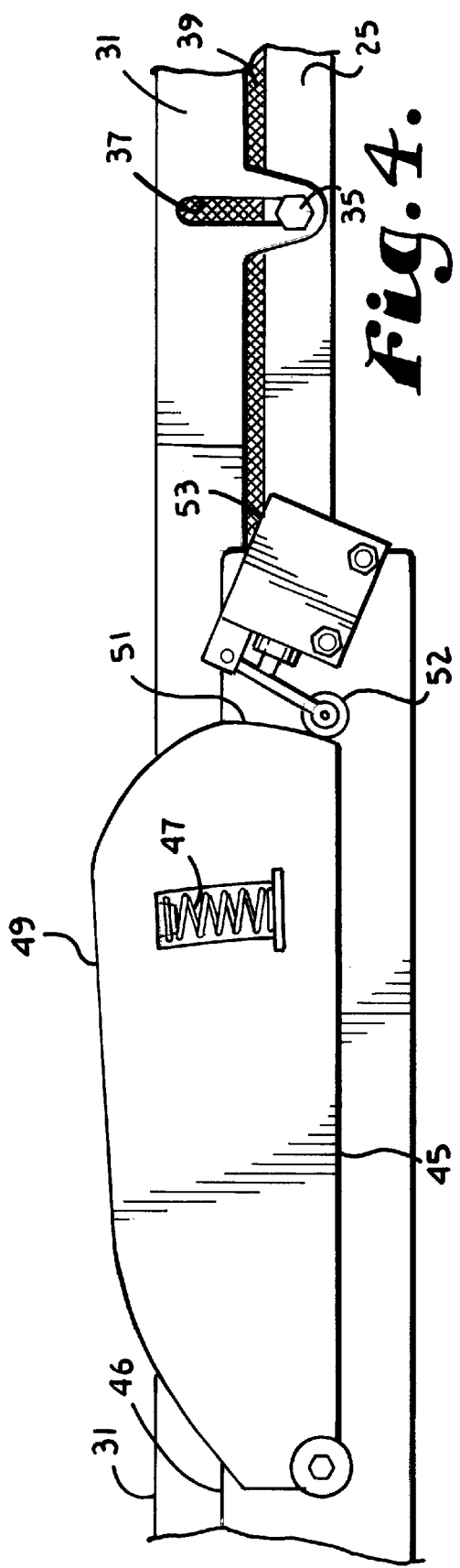
FIG. 4 is an enlarged fragmentary view of a portion of a lifting platform of the pallet conveyor showing a sensor cam and sensor valve attached thereto.

Each cart 21 further includes a pair of lifting platforms 31 which are in the form of inverted channels sized to receive the longitudinal members 25 of the cart 21. Each lifting platform 31 has an upper face 33. As best seen in FIG. 4, the platforms 31 are each connected to a respective one of the longitudinal members 25 by a pair of bolts 35 which pass through respective pairs of elongated holes 37 in the lifting platforms 31. The elongate holes 37 allow the platforms 31 to be moved vertically between raised and lowered positions. In the lowered position, the upper faces 33 of the platforms 31 are spaced downwardly from the upper surfaces 15 of the rails 13, as shown in FIG. 2. In the raised position, the upper faces 33 of the platforms 31 are spaced upwardly from the upper surfaces 15 of the rails 13, as shown in FIG. 3.

Each cart 21 also includes a pair of air bladders 39, one of which is interposed between each lifting platform 31 and the respective longitudinal member 25. The bladders 39 may be constructed of lengths of fire hose having the ends crimped together to form an airtight seal. Each bladder 39 includes a threaded inlet/outlet port. (not shown) for connecting the respective bladder 39 into a pneumatic system 43 of the conveyor 1 to be described later in detail.

As best seen in FIG. 4, each cart 21 further includes a sensor cam 45 which is pivotally connected to a respective one of the lifting platforms 31 by a mounting plate 46 and is biased upwardly by a respective spring 47. Each sensor cam 45 includes a first or upper cam face 49 which will be engaged by a pallet positioned on the respective cart 21 so as to pivot the sensor cam 45 downwardly. A second or end cam surface 51 on each sensor cam 45 engages a roller cam or trigger 52 of a respective sensor valve 53 so as to depress the trigger 52 when the sensor cam 45 is pivoted downwardly by a pallet 3 and thereby actuate the valve 53.

Referring again to FIG. 1, an unloading position sensor 55 is mounted on the frame 11 at the unloading position 9f so as to be pivoted downwardly by any pallet 3 which is located in the unloading position 9f. The sensor 55 engages a trigger 56 of an unloading position sensor valve 57 (shown schematically in FIG. 5) so as to depress the trigger 56 when the sensor 55 is pivoted downwardly by a pallet 3.

The carts 21 are moved reciprocally back and forth along the rails 13 by a double-acting pneumatic indexing cylinder 59 which is connected between the frame 11 and one of the carts 31. The cylinder 59 is shown as having a cylinder body 61 secured to cart 21c by brackets 63. A rod 65 of the cylinder 59 is secured to a cross member 67 which forms a part of the frame 11. When the rod 65 is fully extended, the carts 21 are moved rearwardly, toward the first end 5 of the conveyor 1, such that cart 21a is located in the loading position 9a and cart 21e is in position 9e (hereinafter the "home position"). When the rod 65 is fully retracted, the carts 21 are moved forwardly, toward the second end 7 of the conveyor 1, such that cart 21a is in position 9b and cart 21e is located in the unloading position 9f (hereinafter the "forward position"). It is foreseen that the orientation of the indexing cylinder could be reversed such that when the rod 65 is retracted, the carts are positioned such that cart 21a is located in the loading position 9a, and extension of the rod 65 advances the carts toward the second end 7 of the conveyor 1 and advances cart 21e to the unloading position 9f.

Figure 5:
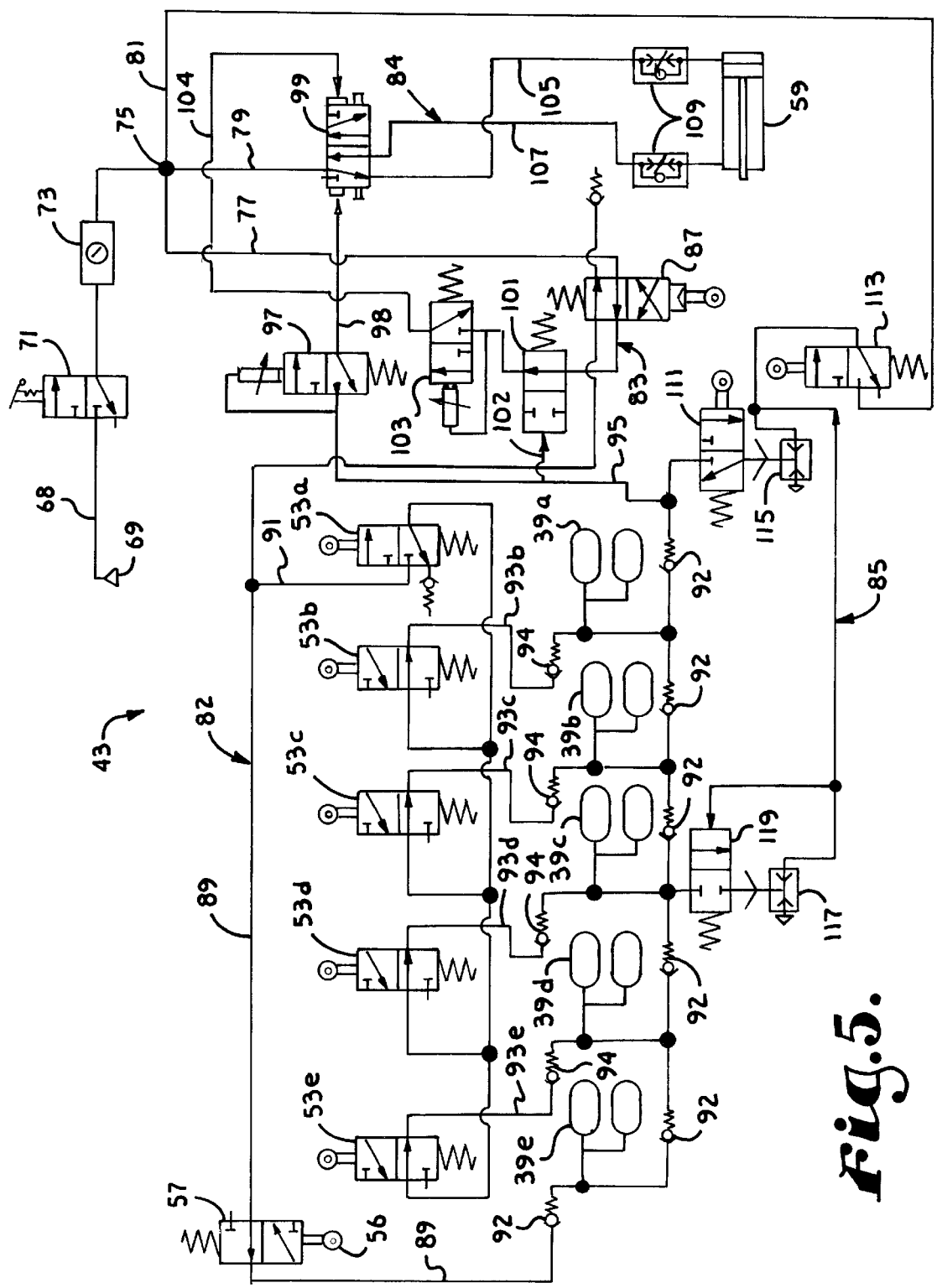
FIG. 5 is a schematic diagram showing the pneumatic circuit controlling the pallet conveyor.

The pneumatic system 43 is schematically depicted in FIG. 5. For each cart 21a–21e, the respective pairs of air bladders 39 are designated as 39a–39e and the respective sensor valves 53 are designated as 53a–53e. Compressed air is supplied to the pneumatic system 43 through a main line 68 from an air source 69 such as an air compressor. A lockout valve 71 controls airflow through the main line 68 and serves to turn the system 43 off and on. A pressure regulator 73, also installed in the main line 68, is adjustable to vary the air pressure within the system 43 to match the weight of the pallets 3 being moved by the conveyor 1. The lighter the pallets 3, the less air pressure is required.

The main line 68 connects to a junction 75 where the flow splits into three branches; an inflation branch 77, an indexing branch 79, and a deflation branch 81. The inflation branch 77 provides air to a bladder inflation circuit 82 and a cylinder extension control circuit 83. The indexing branch 79 provides airflow to a conveyor indexing circuit 84, and the deflation branch 81 provides airflow to a bladder deflation circuit 85.

The inflation branch 77 connects to a four-way inflation control valve 87 which is actuated by the cylinder 59 becoming fully extended such that the carts 21 are in the home position. When actuated, the inflation control valve 87 directs air to the bladder inflation circuit 82 which acts to inflate the air bladders 39. When deactuated, the valve 87 directs air to the cylinder extension control circuit 83, which triggers extension of the cylinder 59 as will be described hereinafter.

Downstream from the inflation control valve 87, the bladder inflation circuit 82 divides into two parallel branches 89 and 91 through which the air bladders 39 may be inflated. A first branch 89 of the bladder inflation circuit 82 is controlled by the unloading position sensor valve 57, which is normally open, and will be closed only upon actuation by a pallet 3 moving into the unloading position 9f. Thus, if a pallet 3 is positioned in the unloading position 9f, no air will flow through the first branch 89. From the unloading position sensor valve 57, air flows to all five pairs of the air bladders 39a–39e, which are connected in parallel to one another. Therefore, if no pallet 3 is located in the unloading position 9f, all of the air bladders 39 will inflate upon actuation of the inflation control valve 87 by the cylinder 59 becoming fully extended. Check valves 92 positioned on each side of each pair of bladders 39 allow airflow from the unloading position sensor valve 57 toward the bladders 39 but prevent airflow in the opposite direction.

A second branch 91 of the bladder inflation circuit 82 is controlled by sensor valve 53a, which is normally closed, and will be opened only upon actuation by a pallet 3 being placed on cart 21a. Thus, if no pallet 3 is positioned on cart 21a, no air will flow through the second branch 91. From the sensor valve 53a, air flows to the remainder of the sensor valves 53b–53e which are normally open and connected in parallel to one another.

Each of the sensor valves 53b–53e controls airflow through a respective leg 93b–93e which is connected to the air bladders 39 of the cart 21 behind the cart on which the respective sensor valve 53b–53e is mounted. For example, sensor valve 53b controls airflow through leg 93b which is connected to bladders 39a, sensor valve 53c controls airflow through leg 93c which is connected to bladders 39b, etc. Each leg 93b–93e includes a respective check valve 94 which allows airflow from the respective sensor valve 53 toward the respective air bladders 39 but prevents flow in the opposite direction.

The second branch 91 of the bladder inflation circuit 82 allows each pair of bladders 39a–39d to be individually locked out and thereby prevented from inflating if all of the positions 9a–9f nearer to the second end 7 of the conveyor 1 are already filled by respective pallets 3. For example, if positions 9c–9f are already filled, sensor valves 53c–53e will be actuated (closed) and bladders 39b will not inflate upon actuation of the inflation control valve 87 (upon retraction of the cylinder 59). Note that bladders 39e are not operable by the second branch 91 and can, therefore, only be inflated through the first branch 89.

Because the first branch 89 and second branch 91 of the bladder inflation circuit 82 are commonly connected to each of the pairs of bladders 39a–39d, the two branches share a common outlet line 95 which will receive air if either sensor valve 53a or the unloading position sensor valve 57 is open. Connected to the inflation circuit outlet line 95 is a retraction timer 97 which starts running upon inflation of one or more pairs of the air bladders 39. The timer 97 is adjustable to create a time delay of from 0–30 seconds after which the timer sends a pilot signal though a pilot line 98 to a cylinder control valve 99, to be described later, which controls flow through the conveyor indexing circuit 84. In response to the pilot signal, the valve 99 causes the indexing cylinder 59 to retract.

When the inflation control valve 87 is deactuated by the cylinder 59 moving out of its fully extended position, air flows into the cylinder extension control circuit 83. Airflow through the circuit 83 is controlled by a pilot operated extension control valve 101. The extension control valve 101 is normally open and is closed by a pilot signal transmitted from the inflation circuit outlet line 95 through a pilot line 102. The valve 101 is thus closed when there is pressure in the outlet line 95 and returns to an open condition upon release of pressure from the bladder inflation circuit 82. (Pressure is released from the bladder inflation circuit 82 by the bladder deflation circuit 85, to be described hereinafter.)

Upon opening of the extension control valve 101, air flows to an extension timer 103. The timer 103 is adjustable to create a time delay of from 0–120 seconds after which the timer sends a pilot signal to the cylinder control valve 99 through a pilot line 104. In response to the pilot signal, the valve 99 causes the indexing cylinder 59 to extend.

The indexing branch 79 supplies air to the conveyor indexing circuit 84 through the cylinder control valve 99, which is a four-way two position pilot-operated valve. The cylinder control valve 99 acts to control extension and retraction of the cylinder 59. The indexing circuit 84 includes a base end line 105 and a rod end line 107 which connect the cylinder control valve 99 to the cylinder 59. Each line 105 and 107 includes a respective speed control valve 109 which is adjustable to vary the speed at which the cylinder 59 extends or retracts.

The cylinder control valve 99 is actuated to retract the cylinder 59 by a retraction signal from the retraction timer 97 mounted in the bladder inflation circuit 82. In response to the retraction signal, the cylinder control valve 99 directs air through the rod end line 107 to the rod end of the cylinder 59, causing it to retract and move the carts 21 to the forward position. Similarly, the cylinder control valve 99 is actuated to extend the cylinder 59 by an extension signal from the extension timer 103 in the cylinder extension control circuit 83. In response to the extension signal, the cylinder control valve 99 directs air through the base end line 105 to the base end of the cylinder 59, causing it to extend and move the carts 21 to the home position.

Air is released from the bladders 39 through the bladder deflation circuit 85. The bladder deflation circuit 85 is connected to the bladder inflation circuit 82 through a deflation valve 111 which is actuated by the cylinder 59 becoming fully retracted (carts 21 in the forward position). The deflation valve 111 is normally closed and opens upon actuation to deflate the air bladders 39. Also actuated by the cylinder 59 becoming fully retracted is a vacuum generator valve 113 which supplies air from the deflation branch 81 to a vacuum generator 115. The vacuum generator 115 is connected to the outlet from the deflation valve 111 and acts to accelerate deflation of the bladders 39 by pulling air out of the inflation circuit 82. In order to further accelerate deflation, one or more supplementary vacuum generators 117 (one shown in FIG. 4) may be added to the deflation circuit 85 in parallel with the vacuum generator 115. These supplementary vacuum generators 117 are connected to the bladder inflation circuit 82 through respective pilot operated deflation valves 119 which open upon receiving a pilot signal from the bladder deflation circuit 85.

Figure 6:
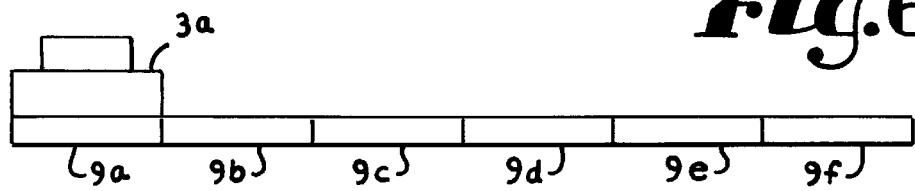
FIGS. 6–16 are motion studies showing movement of pallets along the conveyor under various loading conditions.

In use, a first pallet 3a is placed on cart 21a in the loading position 9a (as shown in FIG. 6), and the conveyor 1 is turned on by opening the lockout valve 71 (see FIG. 5). Because the cylinder 59 is fully extended, the inflation control valve 87 will be actuated, allowing air to flow into the bladder inflation circuit 82. Air will flow through the first branch 89 of the bladder inflation circuit 82 inflating all of the air bladders 39a–39e because no pallet 3 is located in the unloading position 9f and the unloading position sensor valve 57 will, therefore, remain open. Inflation of the bladders 39a will cause the respective lifting platforms 31 to engage the pallet 3a and lift it clear of the upper surfaces 15 of the frame rails 13. Inflation of the bladders 39 will activate the retraction timer 97. After the preset delay period, the timer 97 will send a retraction signal to the cylinder control valve 99, which will supply air to the rod end of the cylinder 59, causing the cylinder 59 to begin to retract and the carts 21 to move toward the forward position. As the cylinder 59 moves out of its fully extended position, the inflation control valve 87 will be deactuated, shutting off flow to the bladder inflation circuit 82 and supplying air to the cylinder extension control valve 101.

When the cylinder 59 reaches its fully retracted position and the carts 21 reach the forward position, the deflation valve 111 and the vacuum generator valve 113 will be actuated. Air will then flow out of the bladders 39 assisted by vacuum from the vacuum generator 115. A pilot signal will also be sent to the pilot operated deflation valves 119, creating flow through the valves 119 which is assisted by the respective supplementary vacuum generators 117.

Figure 7:
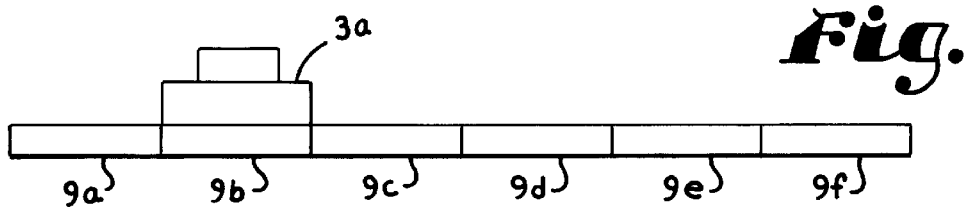

As the bladders 39 deflate, the lifting platforms 31 will drop, and the pallet 3a will come to rest on the upper surfaces 15 of the frame rails 13 (as shown in FIG. 7) in the second position 9b. As the pressure drops in the bladder inflation circuit 82, the extension control valve 101 will open, activating the extension timer 103. After the preset delay period, the timer 103 will send an extension signal to the cylinder control valve 99, which will supply air to the base end of the cylinder 59, causing the cylinder 59 to extend and the carts 21 to move back to the home position. Because the pallet 3a is supported by the frame rails 15, it will remain in the second position 9b (as shown in FIG. 7) as the carts 21 move back to the home position beneath it.

Figure 8:
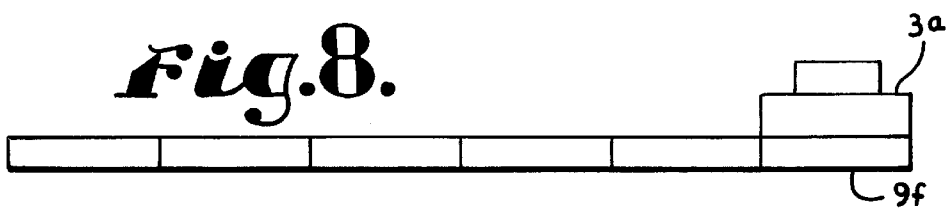

Once the carts 21 return to the home position, the cycle begins over again; this time with the single pallet 3a starting in the second position 9b over the cart 21b and actuating sensor valve 53b, which is thereby moved to a closed condition. Even though the valve 53b is closed, all of the bladders 39a–39e will continue to inflate because the unloading position sensor valve 57 remains open, and air can reach the bladders 39a–39e through the first branch 89 of the bladder inflation circuit 82. The cycle, therefore operates exactly as described above and moves the pallet 3a to the third position 9c. The cycle continues to be repeated, moving the pallet 3a one position forward per cycle until it reaches the unload position 9f as shown in FIG. 8.

With the pallet 3a located in the unloading position 9f, the unloading position sensor valve 57 is moved to a closed condition. After the carts 21 return to the home position, the conveyor 1 will stop until either the pallet 3a is removed from the conveyor or another pallet 3 is placed in the loading position 9a so as to actuate (and thereby open) sensor valve 53a. This is because no air will flow through the bladder inflation circuit 82 with the unloading position sensor valve 57 and sensor valve 53a both closed (again, sensor valve 53a is normally closed and only opened when a pallet 3 is placed in the loading position 9a). With no airflow through the bladder inflation circuit 82, the retraction timer 97 will not being activated to cause retraction of the cylinder 59.

Figure 9:

If a second pallet 3b is placed on the conveyor 1 at the loading position 9a, as shown in FIG. 9, sensor valve 53a will be actuated, allowing air to flow through the second leg 91 of the bladder inflation circuit 82 and thereby causing bladders 39a–39d to inflate. Bladders 39e will not inflate because the unloading position sensor valve 57 is closed due to the presence of pallet 3a in loading position 9f acting on sensor 55. The system is designed to prevent bladders 39e from inflating when a pallet 3, such as pallet 3a, is in the unloading position 9f in order to prevent the lifting platforms 31 on cart 21e from raising and thereby pushing pallet 3a off the end of the rails 13 when cart 21e is subsequently advanced beneath the unloading position 9f.

Figure 10:

In addition to inflating the bladders 39a–39d, airflow into the bladder inflation circuit 82 also starts the retraction timer 97. The conveyor 1 can then complete its cycle, and move pallet 3b to the second position 9b. After the pallet 9b reaches the second position 9b (as shown in FIG. 10) and the carts 21 return to the home position, the conveyor 1 will again stop until either the pallet 3a is removed from the unloading position 9f or another pallet 3 is placed in the loading position 9a. This is an energy saving feature of the conveyor 1 which takes advantage of the idea that there is no need to continue to advance pallets 3 along the conveyor 1 so long as there is a pallet 3 already located in the unloading position 9f and the loading position 9a is open to accept a new pallet 3.

Figure 11:
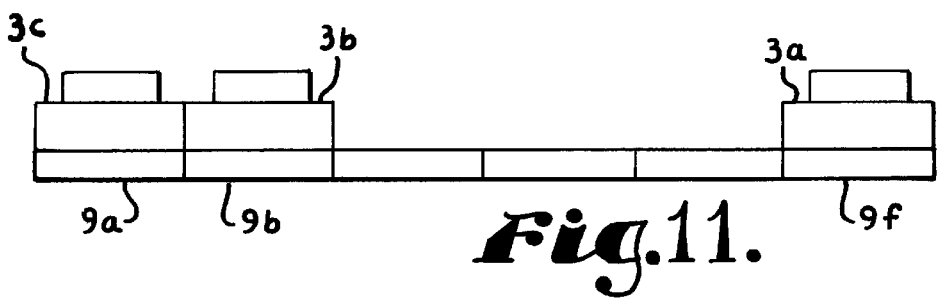
Figure 12:
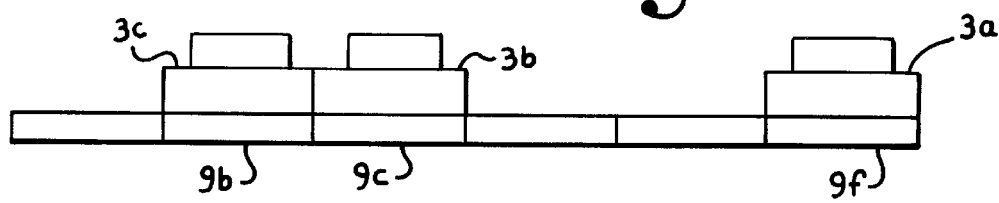

Placement of a third pallet 3c in the loading position 9a as shown in FIG. 11, causes sensor valve 53a to again be actuated, allowing air to flow through the second leg 91 of the bladder inflation circuit 82 and inflating bladders 39a–39d. The conveyor 1 can again cycle, moving pallet 3b to the third position 9c and pallet 3c to the second position 9b (as shown in FIG. 12). After the carts 21 return to the home position, the conveyor 1 will again stop.

Figure 13:
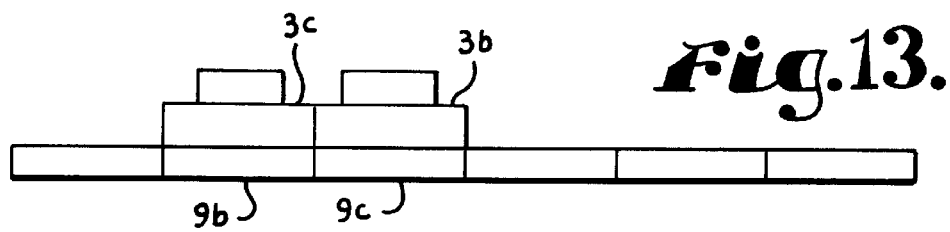
Figure 14:
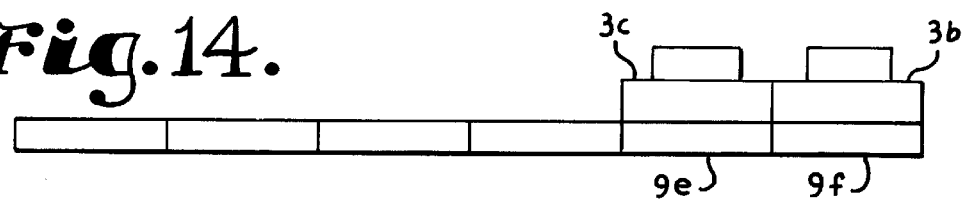

If pallet 3a is removed from the unloading position 9f (as shown in FIG. 13), the unloading position sensor valve 57 will be deactuated, allowing air to flow through the first branch 89 of the bladder inflation circuit 82 and thereby inflating bladders 39a–39e and starting the retraction timer 97. Because the unloading position sensor valve 57 is open, the conveyor 1 will not stop after moving the pallets 3b and 3c ahead a single position 9, but instead will continue to cycle and move pallets 3b and 3c in unison until pallet 3b is in the unloading position 3f and pallet 3c is in position 3e (as shown in FIG. 14). After the pallets 3b and 3c have reached their respective positions 9f and 9e, and the carts 21 have returned to the home position, the conveyor 1 will stop moving.

Figure 15:
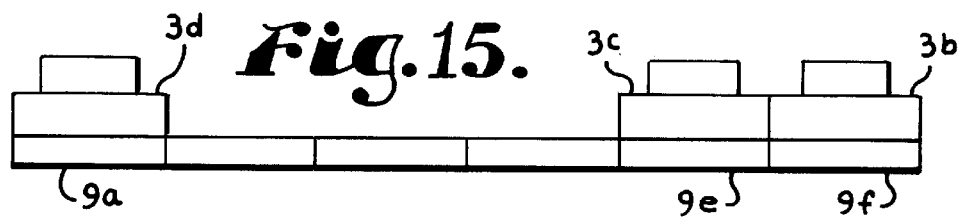
Figure 16:
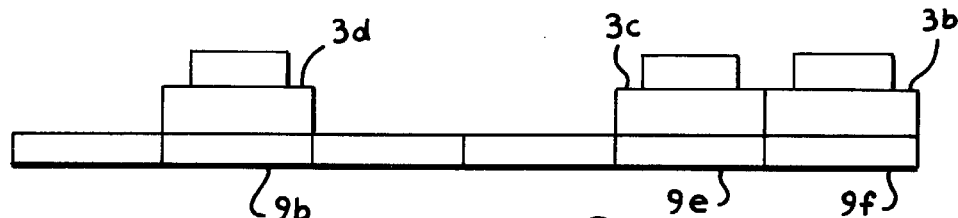

Adding an additional pallet 3d to the conveyor 1 (as shown in FIG. 15), will again cause sensor valve 53a to be actuated, allowing air to flow through the second leg 91 of the bladder inflation circuit 82. The conveyor 1 can then move pallet 3d to the second position 9b (as shown in FIG. 16). Note that the conveyor 1 does not attempt to move either pallet 3b or pallet 3c as pallet 3d is indexed forward. Pallet 3c is not lifted by bladders 39e when the bladder inflation circuit 82 is pressurized because pallet 3b actuates and closes the unloading sensor valve 57, cutting off airflow to bladders 39e through the first branch 89. Furthermore, pallet 3c actuates sensor valve 53e and cuts off flow to bladders 39d through the second branch 91. Because the respective bladders 39e and 39d are not inflated, carts 21e and 21d slide beneath pallets 3b and 3c as carts 21 reciprocate without moving them.

As additional pallets 3 are added to the conveyor 1, more pairs of bladders 39 are locked out by the second branch 91 of the bladder inflation circuit 82 such that the additional pallets 3 can accumulate behind pallet 3b without attempting to push pallet 3b off the second end 7 of the conveyor 1.

Figure 17:
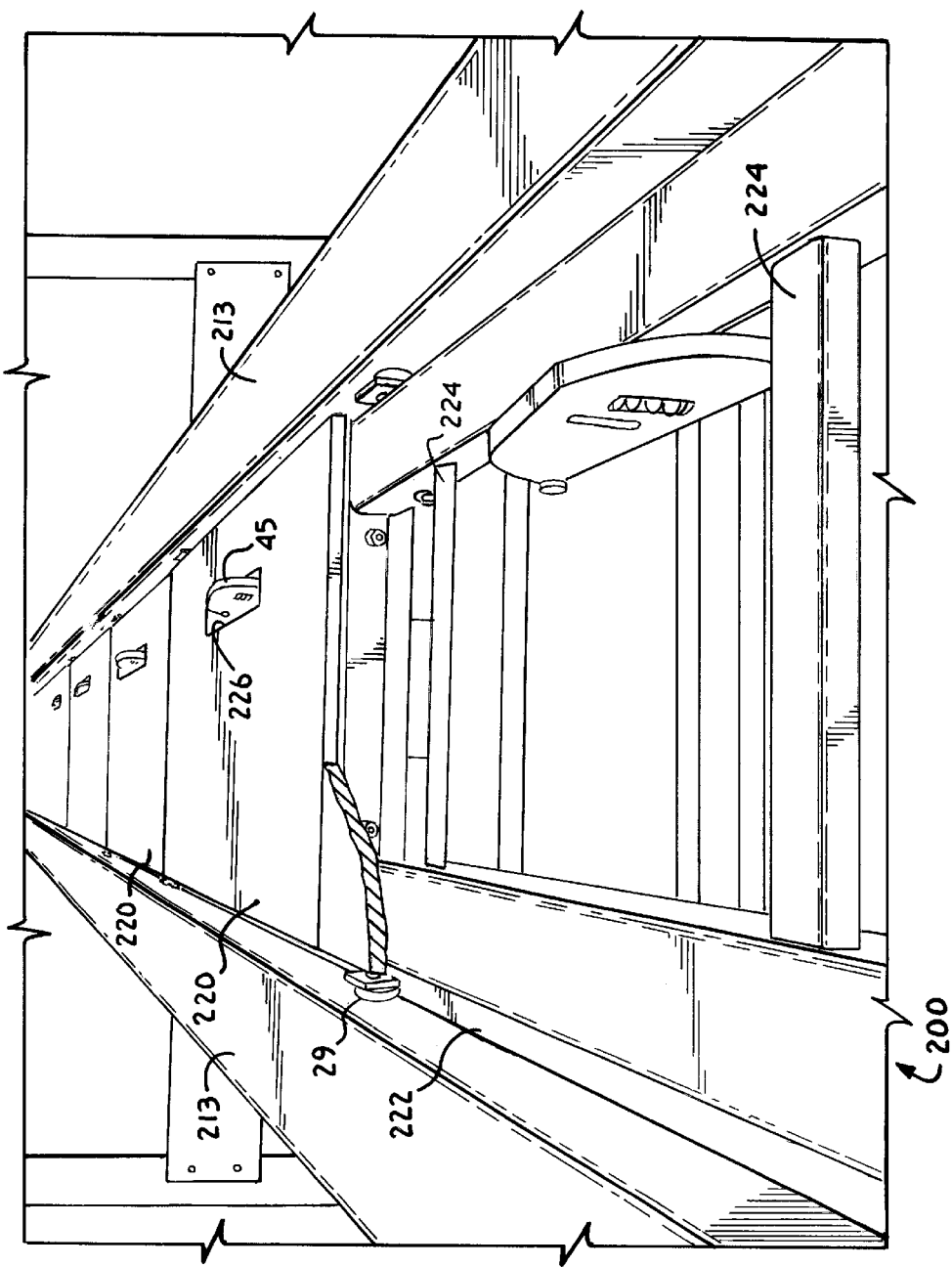
FIG. 17 is a perspective view of a slip sheet conveyor which represents an alternative embodiment of the present invention.

FIG. 17 depicts a slip sheet conveyor 200 which represents an alternative embodiment of the present invention. The conveyor 200 is adapted to convey goods supported on a slip sheet, such as a sheet of corrugated paper, instead of on a pallet. The conveyor 200 is generally identical to the conveyor 1 previously described except that it includes frame side rails 213 which are wider than the rails 13 of the conveyor 1, and further includes a plurality of plates 220 which each cover a respective cart 21. The plates 220 and wider side rails 213 both serve lend additional support to the slip sheets. The side rails 213 each include an inwardly extending flange 222 upon which the wheels 29 of the carts 21 roll.

The plates 220 are generally supported on the upper surfaces 33 of the lifting platforms 31 of each cart 21 and thereby acts as an extension of the platforms 31. In order to further support the plates 220, additional cross members 224 may be added to the carts 21 between the respective lifting platforms 31. The upper surface of each plate 220 is spaced below the upper surfaces 215 of the rails 213 when the bladders 39 on the respective cart 21 are deflated and extends above the upper surfaces 215 when the when the respective bladders are inflated. Each plate 220 includes an elongate opening 226 through which the sensor cams 45 extend.

It is to be understood that while certain forms of the present invention have been illustrated and described herein, it is not to be limited to the specific forms or arrangement of parts described and shown. For example, the conveyor 1 has been described and depicted herein as being a first-in-first-out type conveyor where pallets or other loads are put on the conveyor at a first end and moved toward a second end where they are unloaded. It is to be understood that the same novel design and pneumatic circuitry could also be adapted to a first-in-last-out type conveyor where the loads are both added and removed at the first end and accumulated toward the second end.

What is claimed and desired to be secured by Letters Patent is as follows:

1. A conveyor for advancing load units from a loading position toward an unloading position, said conveyor comprising:
  a) a track having a first end and a second end and including a pair of side rails, each of said side rails having an upper surface, said track defining a plurality of sequential load unit positions, a first of said load unit positions being a loading position proximate said track first end and a last of said load unit positions being an unloading position proximate said track second end;
  b) a plurality of interconnected carts moveable along said track, said plurality of carts being at least one fewer in number than the number of said load positions, a first of said carts being proximate said track first end and a last of said carts being proximate said track second end, each of said carts being adapted to receive a respective load unit and including pneumatic lifting means for moving the load unit between a lowered position wherein the load unit rests on said side rail upper surfaces and a raised position wherein the load unit is lifted clear of said side rail upper surfaces;
  c) pneumatic drive means connected between said track and said carts for reciprocally moving said carts along said track between a home position wherein said first cart is in said loading position and a forward position wherein said last cart is in said unloading position; and
  d) pneumatic control means for simultaneously controlling said drive means and each said lifting means so as to advance a load unit from said loading position toward said unloading position by cyclically moving the load unit into said raised position, moving said carts into said forward position, moving said load unit into said lowered position, and moving said carts back into said home position beneath the load unit.

2. The conveyor as in claim 1 wherein each of said track side rails includes an inwardly extending flange and each of said carts includes a plurality of wheels, each of said wheels riding on one of said flanges.

3. The conveyor as in claim 1 wherein each said lifting means comprises a pair of air bladders positioned under respective lifting platforms, said air bladders being inflatable to raise said lifting platforms and deflatable to lower said lifting platforms.

4. The conveyor as in claim 1 wherein said drive means comprises a pneumatic cylinder connected between one of said carts and said track.

5. The conveyor as in claim 1 wherein said control means includes means for locking out individual ones of said lifting means as load units accumulate proximate said unloading position.

6. The conveyor as in claim 1 wherein said control means acts to stop said lifting means and said drive means if a load unit is positioned in said unloading position and no load unit is positioned in said loading position.

7. The conveyor as in claim 1 wherein said control means acts to continuously cycle said lifting means and said drive means to advance a load unit into said unloading position if no load unit is so positioned.

8. A conveyor for advancing load units from a loading position toward an unloading position, said conveyor comprising:
   a) a track having a first end and a second end and including a pair of side rails, each of said side rails having an upper surface, said track defining a plurality of sequential load unit positions, a first of said load unit positions being a loading position proximate said track first end and a last of said load unit positions being an unloading position proximate said track second end;
   b) a plurality of interconnected carts moveable along said track, said plurality of carts being at least one fewer in number than the number of said load positions, a first of said carts being proximate said track first end and a last of said carts being proximate said track second end, each of said carts being adapted to receive a respective load unit and including a lifting platform and an air bladder positioned beneath said lifting platform, said air bladder being selectively inflatable and deflatable for moving the load unit between a lowered position wherein the load unit rests on said side rail upper surfaces and a raised position wherein the load unit is lifted clear of said side rail upper surfaces;
   c) a pneumatic cylinder connected between said track and said carts for reciprocally moving said carts along said track between a home position wherein said first cart is in said loading position and a forward position wherein said last cart is in said unloading position; and
   d) a pneumatic system connected to said cylinder and each said bladder and operable to advance a load unit from said loading position toward said unloading position by cyclically moving the load unit into said raised position, moving said carts into said forward position, moving said load unit into said lowered position, and moving said carts back into said home position beneath the load unit.

9. The conveyor as in claim 8 wherein each of said track side rails includes an inwardly extending flange and each of said carts includes a plurality of wheels, each of said wheels riding on one of said flanges.

10. The conveyor as in claim 8 wherein said pneumatic system includes a sensor mounted on each of said carts, each said sensor being operable in response to a load unit being positioned on the respective cart to actuate a respective cart sensor valve.

11. The conveyor as in claim 10 wherein said pneumatic system further includes an unloading position sensor mounted on said track at said unloading position, said unloading position sensor being operable in response to a load unit being positioned in said unloading position to actuate a respective unloading position sensor valve.

12. The conveyor as in claim 10 wherein said pneumatic system includes a bladder inflation circuit for selectively inflating said air bladders, airflow into said bladder inflation circuit being controlled by a bladder inflation valve which is actuated upon said carts arriving in said home position.

13. The conveyor as in claim 12 wherein said bladder inflation circuit includes a first branch, airflow into said first branch being controlled by said unloading position sensor valve, said first branch being connected to all of said air bladders such that all of said air bladders may be inflated when no load unit is positioned on said track at said unloading position.

14. The conveyor as in claim 13 wherein the one of said cart sensor valves actuated by the one of said sensors on said first cart is a normally closed valve and said bladder inflation circuit further includes a second branch in parallel to said first branch, airflow into said second branch being controlled by said normally closed valve such that no air will flow into said second branch unless a load unit is positioned on said first cart.

15. The conveyor as in claim 14 wherein the rest of said cart sensor valves are normally open valves and said second branch further includes a plurality of parallel legs, airflow through each of said legs being controlled by a respective one of said normally open cart sensor valves, each of said legs being connected to the one of said air bladders on the cart which is one cart nearer to the first of said carts than is the cart to which the sensor actuating the respective sensor valve is mounted.

16. The conveyor as in claim 15 wherein said first branch and said second branch are interconnected such that a respective air bladder is not inflatable if load units are positioned at said unloading position and on any of said carts which are nearer to said last cart than the cart on which said respective air bladder is mounted.

17. The conveyor as in claim 12 wherein said pneumatic system further includes a first timer, said first timer being actuated upon inflation of any of said air bladders and adapted to initiate movement of said pneumatic cylinder to move said carts toward said forward position after a preset delay period.

18. The conveyor as in claim 17 wherein said pneumatic system further includes a second timer, said second timer being actuated upon deflation of any of said air bladders and adapted to initiate movement of said pneumatic cylinder to move said carts toward said home position after a preset delay period.

19. The conveyor as in claim 18 wherein airflow to said second timer is controlled by a pilot operated valve having a pilot line in communication with said bladder inflation circuit, said pilot operated valve opening upon loss of pressure in said bladder inflation circuit.

20. The conveyor as in claim 19 wherein airflow to said pilot operated valve is controlled by said bladder inflation valve and is initiated upon said bladder inflation valve being deactuated by said pneumatic cylinder beginning to move out of said home position.

21. The conveyor as in claim 8 wherein said pneumatic system includes a bladder deflation valve in communication with said air bladders, said bladder deflation valve being actuated upon said carts arriving in said forward position.

22. The conveyor as in claim 21 and further including a vacuum generator in communication with said bladder deflation valve, said vacuum generator acting to accelerate the rate of flow through said bladder deflation valve.

23. The conveyor as in claim 22 wherein said vacuum generator receives air through a vacuum generator valve, said vacuum generator valve being actuated upon said carts arriving in said forward position.

24. A conveyor comprising:
 a) a track having a first end and a second end and including a pair of parallel side rails, each of said side rails having an upper surface and an inwardly extending flange spaced downwardly from said upper surface;
 b) a plurality of interconnected carts moveable along said track, each said cart including:
  i) a pair of generally parallel longitudinal members;
  ii) a pair of lifting platforms, each of said lifting platforms being moveably mounted to a respective one of said longitudinal members and including an upper surface and a downwardly facing channel sized and shaped to receive the respective longitudinal member;
  iii) a pair of air bladders, each of said air bladders being interposed between a respective longitudinal member and the respective lifting platform, said pair of air bladders being selectively inflatable and deflatable to move the respective lifting platforms between a raised position wherein said lifting platform upper surfaces are above said side rail upper surfaces and a lowered position wherein said lifting platform upper surfaces are below said side rail upper surfaces; and
  iv) a plurality of wheels, each of said wheels riding on one of said inwardly extending flanges on said track side rails;
 c) a pneumatic cylinder connected between said track and said carts for reciprocally moving said carts relative to said track; and
 d) a pneumatic control system connected to said cylinder and each said pair of air bladders and operable to selectively supply air to said pneumatic cylinder and said air bladders.

25. A conveyor for advancing load units from a loading position toward an unloading position, said conveyor comprising:
 a) a track having a first end and a second end and including a pair of side rails, each of said side rails having an upper surface, said track defining a plurality of sequential load unit positions, a first of said load unit positions being a loading position proximate said track first end and a last of said load unit positions being an unloading position proximate said track second end;
 b) a plurality of interconnected carts moveable along said track, said plurality of carts being one fewer in number than the number of said load positions, a first of said carts located proximate said track first end and a last of said carts located proximate said track second end, each of said carts being adapted to receive a respective load unit and including a lifting platform and an air bladder positioned beneath said lifting platform, said air bladder being selectively inflatable and deflatable for moving the load unit between a lowered position wherein the load unit rests on said side rail upper surfaces and a raised position wherein the load unit is lifted clear of said side rail upper surfaces;
 c) a pneumatic cylinder connected between said track and said carts for reciprocally moving said carts along said track between a home position wherein said first cart is in said loading position and a forward position wherein said last cart is in said unloading position; and
 d) a pneumatic circuit supplying air from a source of pressurized air to said cylinder and each said bladder, said pneumatic circuit including an unloading position sensor valve which is normally open and includes a first valve actuator extending into said unloading position, and a first cart sensor valve which is normally closed and includes a second valve actuator positioned on said first cart; said pneumatic circuit including a bladder inflation circuit having a first branch passing through said normally closed second valve and connected to each of said bladders; said bladder inflation circuit further including a second branch passing through said normally open first valve and connected to each of said bladders; said pneumatic circuit further comprising a pneumatic cylinder supply circuit for altenatingly supplying pressurized air to a first end of said cylinder to advance said carts to said home position and to a second end of said cylinder to advance said carts to said forward position; and wherein pressurized air is not supplied to said second end of said cylinder to advance said carts to said forward position if said unloading position sensor valve and said first cart sensor valve are closed.

26. The conveyor as in claim 25 wherein pressurized air is not supplied to said air bladder positioned beneath the lifting platform of said last cart if said unloading position sensor valve is closed.

27. The conveyor as in claim 26 further comprising a normally open cart sensor valve associated with each of said carts after said first cart and each of said cart sensor valves having a valve actuator positioned on said associated cart, each cart sensor valve connected to said second branch of said bladder inflation circuit and preventing air from being supplied to said bladder on said immediately preceding cart if the respective cart sensor valve and each successive cart sensor valve and said unloading position sensor valve is closed.

* * * * *